United States Patent Office 3,605,911
Patented Sept. 20, 1971

3,605,911
MACHINE TOOL CONTROL SYSTEMS
Albert Grosseau, Chaville, France, assignor to Societe Anonyme Andre Citroen, Paris, France
Filed Mar. 18, 1969, Ser. No. 808,257
Claims priority, application France, Mar. 26, 1968, 3,482
Int. Cl. B23b *39/10*
U.S. Cl. 173—9
9 Claims

ABSTRACT OF THE DISCLOSURE

The axial movement of a rotating machine tool is controlled by an operating sequence valve that delivers an output signal for controlling axial movement of the tool in accordance with a variable input signal from a torque detector associated with the tool and an adjustable threshold value to which the valve is subjected.

BACKGROUND OF THE INVENTION (1) Field of the invention

The present invention relates to grinding or micro-cutting machines employing an expanding tool.

(2) Description of the prior art

Such machines include a hollow spindle for driving the tool, bearings in which this spindle can not only rotate about its axis but also carry out axial movement, a rod that can be moved axially in the spindle so as to expand the tool, means whereby rotary motion can be imparted to the spindle, means whereby the spindle can be moved axially and means whereby the expander rod can be moved within the spindle.

The object of the present invention is to provide an improved grinding or micro-cutting machine.

SUMMARY OF THE INVENTION

According to the present invention there is provided a grinding micro-cutting or other machine tool comprising a hollow spindle for driving the tool, bearings in which this spindle is both rotatable and axially movable, a rod movable axially within the spindle, so as to expand the tool, drive mechanism for imparting rotary motion to the spindle, further drive mechanism for moving the spindle axially, and means for moving the expander rod within the spindle, characterised by the incorporation of means controlled by the tool expander rod, for stopping the travel of the rod as soon as it has moved through a given distance.

DESCRIPTION OF THE PREFERRED EMBODIMENT

Figure 1:
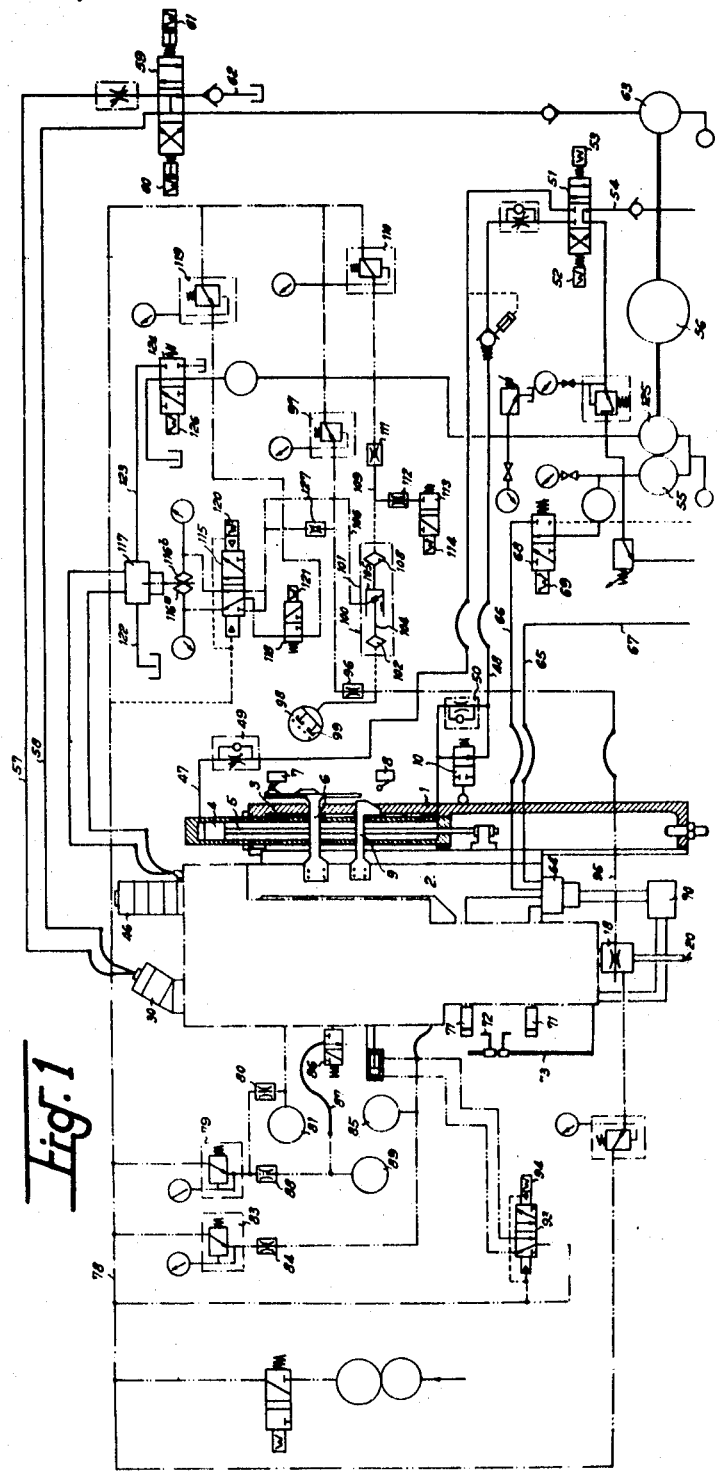
FIG. 1 is a diagram of the hydraulic and pneumatic system of the machine tool.
Figure 2:
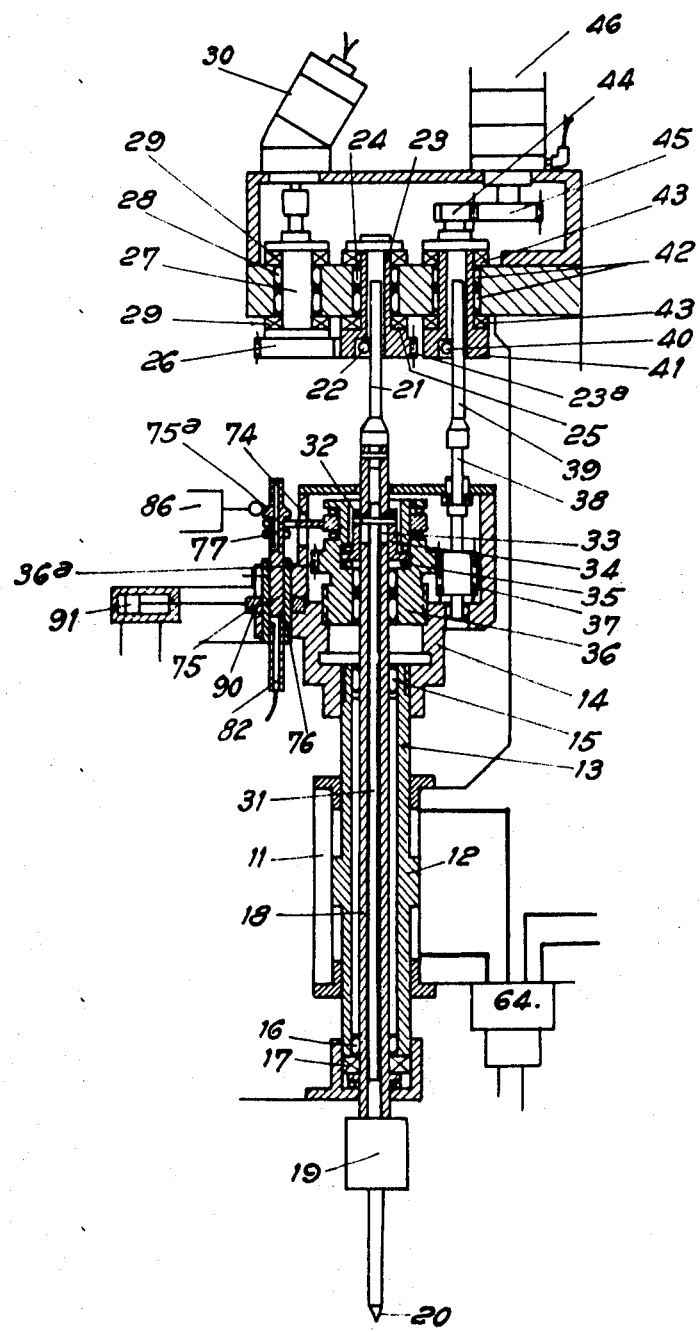
FIG. 2 is a cross-section of the tool-carrying head of the machine.

The micro-machining head shown in FIGS. 1 and 2 comprises a fixed stand 1, with a support 2, mounted for vertical sliding motion in relation to the stand. A double-acting ram 3, the body of which is fixed to the stand 1, while the piston 4 is connected by the rod 5 to the support 2, enables the latter to be moved in relation to the stand 1.

An arm 6 is fixed to the support 2, which arm operates a micro-switch 7 when the support is in its upper position and which operates a micro-switch 8 when the support is near to its lower position. Likewise fixed to the support is another arm 9, which operates a distributor valve 10 when the support is in its lower position.

The support 2 carries the cylinder 11 of a double-acting ram, the piston 12 of which is fixed to or is integral with a tube 13, fixed to a casing 14. A hollow spindle 18, the bottom end of which is connected through a torque detector 19 to the machining tool 20, is rotatably mounted in the tube 13 and casing 14, with the aid of ball bearings 15 and 16 and a thrust ball bearing 17.

The upper end of the spindle 18 is rigid with a triangular-sectioned driving shaft 21, which can slide between three bearings 22, the spindles of which are carried by a bush 23. This bush is mounted with freedom to rotate in the support 2 by means of bearings 24 and thrust ball bearing 25. It has external gear teeth 23a, in mesh with a pinion 26 keyed to a spindle 27, which is rotatably mounted in the support 2 by means of bearings 28 and thrust ball bearings 29 and is coupled to the shaft of a hydraulic motor 30. It can thus be seen that the piston 12 of the ram 11 can impart motion to the spindle 18 through the thrust bearing 17 and that the motor 30 rotates this spindle, whatever its axial position.

The tool is of the expanding type and can be opened out by an expander rod 31, which slides within the spindle 18 and of which the conical tip can be seen at 20. The upper end of the rod 31 is connected by a pin 32, which passes through openings 33 in the spindle 18 to a bush 34 which is free to turn in bearing 35 within an expansion screw 36. The latter screws into a threaded bore in the casing 14 and carries peripheral teeth 36a in mesh with a pinion 37. This pinion is keyed to the rotary spindle 38 mounted in the casing 14.

The spindle 38 is coupled to another spindle 39 of triangular section, which can slide between three bearing balls 40, carried in a bush 41. This bush, which is rotatably mounted by means of the bearings 42 and thrust ball bearing 43, in the support 2, is fixed to or made integral with a pinion 44 in mesh with a pinion 45 keyed to the shaft of a hydraulic motor 46.

The motor 46 drives the spindle 38, which in turn drives the screw 36. This, being in mesh with the screwthread in the casing 14, moves axially, taking with it the expander rod 31, thereby altering the expansion of the tool.

By means which will be described in detail hereinafter, the support 2 can be lowered, the chambers of the ram 11 can be brought under pressure alternately, so that the tube 13 reciprocates longitudinally or "beats," carrying with it the spindle 18 and hence also the tool; the motor 46 can be operated so as to move the expander rod 31 axially, so that the tool works at constant torque; and, finally, when the work is finished, the rod 31 can be restored to its starting position, the beat of the tube 13 stopped and the support 2 raised again.

The chambers of the ram 3 are connected by pipes, 47 and 48, in which are inserted regulators 49 and 50 controlling the flow to a distributor valve 51, operated by electromagnets 52 and 53, another distributor 10, being connected in parallel with the regulator 50.

The distributor valve 51 communicates with a blow-off pipe 54, and with a pump 55, driven by an electric motor 56.

At the start of the cycle, the electro-magnet 52 is energised, causing the support 2 to descend. At the end of the cycle, the electro-magnet 52 is deenergised and the electro-magnet 53 is energised to raise the support again.

The motor 30 is connected by pipes 57 and 58, to a distributor 59, controlled by two electro-magnets 60 and 61. This distributor communicates with a blow-off pipe 62, and with a pump 63 driven by the motor 56.

At the start of the cycle, the magnet 61 is energised at the same time as the magnet 52, so that the support 2 is lowered and the spindle 18 starts to rotate, driving the tool 20.

The chambers in the ram 11 communicate with a servo-valve 64, which in turn communicates through pipes, 65 and 66, to a blow-off pipe 67 and, through a distributor valve 68 controlled by an electro-magnet 69, to the pump 55. The micro-switch 8 is connected in the supply circuit of this magnet. Thus, when the support 2 descends, carrying with it the spindle 18, this distributor 68 opens as the arm 6 meets the micro-switch 8, so that the servo-valve 64 is brought under pressure and the spindle 18 begins its reciprocating movement, as explained hereunder.

The servo-valve 64 is controlled by an electrical device 70, which incorporates an electronic flip-flop, itself controlled by two electrostatic contacts. Each of these comprises one stationary capacitor element 71, and a second capacitor element 72, which is fixed, with provision for adjustment, to a rod 73, in turn secured to the tube 13. When the element 72 enters its associated element 71, the resultant variation in capacity trips the flip-flop, the result being to reverse the direction of flow of liquid in the servo-valve 64 and hence the direction of movement of the piston 12 in the ram cylinder 11.

A fork 74 is carried by the expansion screw 36 through the agency of thrust ball bearings. This fork 74 thus moves at the same time as the expander rod 31. Since the tool undergoes no wear of any significance, the displacement of the fork is linked to the size of the bore formed by this tool 20.

The fork 74 carries with it a pneumatic piston-valve 75, movable within a cylinder 76, which may be regarded as stationary in relation to the casing 14. When the fork 74 is at or near its top position, that is to say when the tool is not fully expanded, a passage 77, within the valve 75, is opened to the atmosphere. This passage 77 is connected to a general air feed pipe 78, through a pressure-reducing valve 79 and an orifice 80. A pressure-operated contact 81 communicates with the passage 77 beyond the orifice 80. The fork 74 having been lowered a certain distance, the passage 77 is closed by the cylinder 76, so that the pressure in this passage rises, thus operating contacts 81.

A second passage 82 is provided in the valve 75. This passage 82, which is opened to the atmosphere when the fork 74 occupies its lower position, that is to say when the desired bore dimension has been obtained, communicates with the pipe 78 through the pressure-reducing valve 83 and orifice 84. A pressure-operated contact 85 communicates with the passage 82 beyond the orifice 84. When machining is complete, the passage 82 is opened to the atmosphere, so that the pressure within it falls, thereby operating the contact 85.

Finally, the valve 75 carries a projection 75a, which, when the fork 74 is in its upper position, that is to say when the tool is collapsed, opens the valve 86, so that a passage 87 communicating with the pressure regulator 79 through the orifice 88 is opened to the atmosphere. A pressure-operated contact 89 is connected to the passage 87 beyond the orifice 88. This pressure contact is thus operated according to whether the tool is or is not collapsed.

Notwithstanding the hardness of the tool, it does at last wear after a certain number of operations. To offset this wear, the position of the cylinder in relation to the casing 14 can be adjusted by a ratchet wheel 90, which is screwed to the cylinder and fitted into a recess in the casing. This ratchet wheel operates in conjunction with a pawl fixed to a piston 91, which moves in a double-acting cylinder 92. This cylinder can be connected to the general feed pipe 78 through a distributor 93, operated by an electro-magnet 94.

When wear has occurred, all that is required is to energise the magnet 94, which drives the piston 91 and turns the ratchet wheel 90, the magnet then being deenergised. This operation is repeated until the wear has been taken up.

The pressure-operated contacts 81, 85 and 89 and the torque detector 19 are used to control the running of the motor 46 and hence the expansion of the tool, as described hereinafter.

Figure 3:
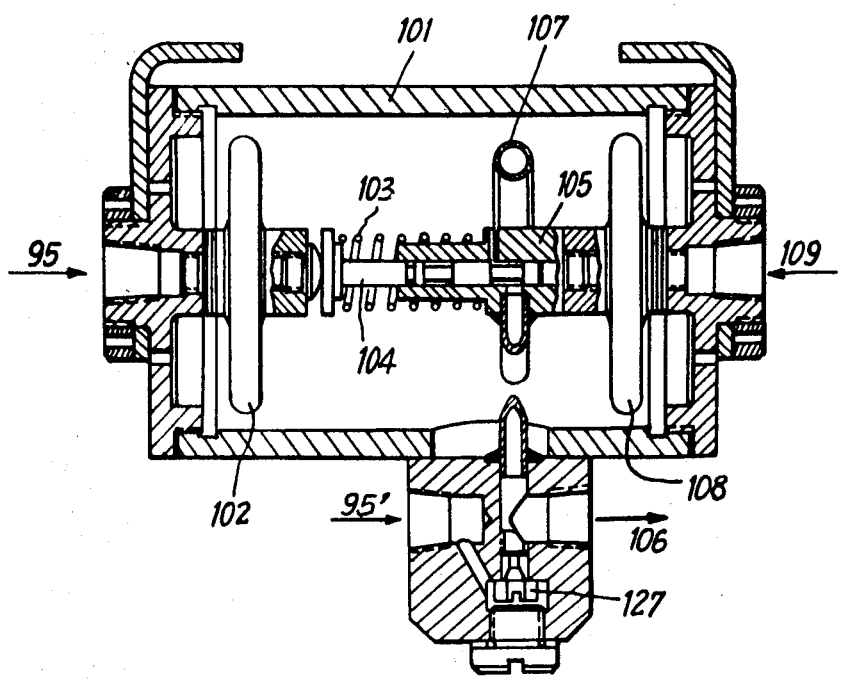
FIG. 3 is a cross-section of a pilot valve forming a part of the system of FIG. 1.

The torque detector 19 is of the type described in the French patent, numbered 1,538,652. It comprises mean whereby the flow cross-section of an air passage 95, (FIG. 3) can be varied according to the torque reaction. The passage 95 is connected to the general feed pipe 78 through the orifice 96 and pressure regulator 97. The pressure in that passage 95 thus varies with the flow cross-section of that passage and hence with the torque reaction, this pressure variation being employed to control the movement of the motor 46.

The reference numerals 89 and 99 designate two pressure-operated contacts, which are connected to the passage 95 and act when the torque is at its minimum and maximum values respectively. The contact 99 is inserted in the supply circuit of a signalling lamp and in the circuits of the electro-magnets 61 and 69; consequently, when the torque exceeds its maximum value, the lamp glows, the tube 13 ceases to reciprocate and the spindle 18 stops rotating.

The passage 95 is connected to a pilot "potentiometric" sequence valve, numbered generally 100, which enables the operating torque to be regulated and maintained at the chosen level, measurement and control being carried out separately.

The valve 100 (FIG. 3) comprises a casing 101, within which is anchored, by one of its walls, a bellows, 102, in communication with the passage 95. The other wall of this bellows acts, in opposition to a restoring spring 103, on a plunger portion 104 of a valve body 105, which enables the pipe 106 to be opened to exhaust by way of a flexible hose 107.

It will be noted that, starting from the position shown in FIG. 1, the pipe 106 is opened to exhaust only when the plunger 104 has travelled a certain distance, corresponding to a pressure drop within the passage 95; the spring 103 acts on the plunger in a direction corresponding to the opening of the valve.

Again, the valve body 105 is movable within the casing 101, communicating with one wall of a second bellows 108, the other wall of which is fixed to the casing 101. The bellows 108 is connected to the general feed pipe 78 by the pipe 109, in which the adjustable pressure regulator 110 and orifice 111 are inserted. That part of the passage 109 which lies beyond the orifice 111 communicates via the orifice 112 with a distributor 113, controlled by an electro-magnet 114. This magnet 114 opens the distributor 113 when energised, thereby opening the orifice 112 to exhaust; the micro-switch 8 and a contact of a delay relay operated by the pressure contact 81 are inserted in the supply circuit of the magnet 114 in such a way that the operation of the micro-switch 8 energises the magnet, while that of the delay relay deenergises the magnet.

As will be seen later, the pressure in the pipe 106 controls a servo-valve 117, which operates the motor 46 in such a way that when this pressure falls below a certain level, the motor 46 stops, thereby stopping the expanding of the tool, and when the pressure exceeds the said level, the motor 46 re-starts and expansion is resumed.

This being so, if it be assumed that the pressure in the pipe 109 is constant and the motor 46 is running, that is to say that the tool is expanding, the torque reaction has a certain value and increases as expansion proceeds, resulting in a reduction of pressure in the pipe 95. The plunger 104 moves within the cylinder 105, but the pipe 106 remains initially cut off from the atmosphere, so that the expansion continues at constant speed.

When the torque reaction reaches approximately the value pre-determined as explained hereunder, the plunger 104 gradually opens the pipe 106 to the atmosphere; the pressure in this pipe falls and then the servo-valve 117 reduces the supply to the motor 46 and then cuts it off, so that the speed of expansion of the tool is reduced and then becomes zero.

From that moment, the operating torque remains practically constant, since, if the torque reaction falls, the pressure in the pipe 95 rises and the servo-valve 117 restores power to the motor 46.

It will be seen from the foregoing that the speed of expansion remains high, because the early travel of the plunger has no effect on the pressure prevailing in the pipe 106, but that the speed gradually falls when the operating torque is almost at its pre-determined value. In this way, an abrupt tool approach is eliminated, but this approach is nevertheless rapid.

The moment when the pipe 106 is opened to the atmosphere depends on the position of the cylinder 105 and hence on the pressure in the pipe 109. The value of the operating torque thus depends on this pressure; the higher the pressure, the higher the torque.

The pressure regulator 110 thus enables the value of the operating torque to be regulated.

The opening of the distributor 113 reduces the pressure in the pipe 109 and so reduces the value of the operating torque.

The pipe 106 is in communication with that portion 95′ of the pipe 95 which lies between the orifice 96 and the regulator 97 by way of an orifice 127, here incorporated in the valve 100; it can also be placed in communication by a distributor valve 115, with one or other of two bellows 116a and 116b, which operate the servo-valve 117. Whichever one of the bellows is not in communication with the pipe 106 can be opened to the atmosphere or can communicate with the general feed pipe 78 through the distributor 118 and the pressure regulator 119, which is adjusted to a value below the setting of the regulator 97.

The distributor 115 is controlled by an electro-magnet 120, in the supply circuit of which the pressure-operated contacts 98 are inserted. Closing these contacts energises the magnet 120, the distributor 115 being thereby brought into a position in which the servo-valve 117 causes the expander rod 31 to rise. As for the distributor 118, this is controlled by the electro-magnet 121, in the supply circuit of which are inserted the micro-switch 8 and the contact of a second delay relay, itself operated by the contacts 98; the connections are such that the distributor 118 isolates the bellows 116a or 116b from the atmosphere when the micro-switch 8 is operated and contacts 81 have not yet operated.

The servo-valve 117, designed in the form of a ram, for example, enables the motor 46 to be connected either to an exhaust pipe 122, or to a pipe 123. The latter may itself be connected through the distributor 124 to a pump, 125, driven by the motor 46. The distributor 124 is operated by the electro-magnet 126, in the supply circuit of which are inserted the micro-switch 8 and contacts 85, as well as a contact of the second delay relay.

During operation, the bellows 116b, for example, is connected to the pressure regulator 97. If the valve 100 then isolates the pipe 106 from the atmosphere, the pressure in the bellows 116b will be that determined by the regulator 97. As regards the bellows 116a, this, for example, will be open to atmosphere. The speed of expansion, which depends on the difference between the pressures in the bellows 116b and 116a, is high.

If the distributor 121 is operated, the bellows 116a will be placed in communication with the pressure regulator 119. The difference between the pressures in the bellows 116b and 116a is now reduced, becoming equal to the difference between the settings of the regulators 97 and 119; the speed of expansion falls and is then stabilised at a value proportional to that difference.

When the operating torque increases to its pre-determined value, the pipe 106 is gradually opened to the atmosphere by the valve 100, as mentioned hereinbefore. The bellows 116b being then supplied with a constant flow of air, because of the presence of the orifice 127, the pressure in this bellows will steadily fall; the same applies to the speed of expansion, which falls to zero when the operating torque reaches its pre-determined value.

The general mode of operation of the micro-machining head based on the invention principle will be clearly evident from the foregoing.

The start of the cycle is possible only if the contact 7 is operated and the contacts 89 closed, indicating that the support 2 is raised and the grinding or cutting tool collapsed.

When that is so, as already explained, the electromagnets 52 and 61 are energised, the support 2 descends and the spindle begins to rotate.

At the end of the downward movement, the microswitch 8 is operated and as a result the electro-magnet 69 is energised, so that the spindle begins to beat; the magnet 126 is energised, so that the operating liquid is fed to the servo-valve 117; the magnet 114 of the distributor 113 is energised, so that part of the air from the orifice 111 passes to exhaust and the operating torque is regulated to a lower level; and, finally, the magnet 121 is energised, so that the bellows 116a is opened to the atmosphere. Expansion commences.

Then the pressure contacts 81 operate, cutting off the current from the magnet 121 and energising the first delay relay; the expansion slows down. The tool makes contact with the workpiece and works at low torque until the delay relay operates, cutting off the current from the magnet 114. The operating torque then assumes its normal value and the workpiece is machined at constant torque.

Once the workpiece is of the desired dimensions, the pressure contacts 85 disconnect the current from the magnet 176, so that the motor 46 is cut off; expansion ceases.

The tool smooths the workpiece, so that the torque reaction is reduced and the pressure in the pipe 95 resumes its initial value. The pressure contact 98 operates, thereby energising the magnet 120 and reversing the distribution direction of the distributor 115; the second delay relay is energised.

Then the delay relay closes and causes the magnet 126 to be re-energised so that the servo-valve 117 is energised once more, as well as the magnet 121. Because of the reversal of the distributor 115, the bellows 116b is connected to the regulator 119, while the bellows 116a is opened to the atmosphere; the motor 46 runs at high speed in a direction opposite to its previous direction of rotation and the expander rod rises rapidly.

At the same time, the delay relay deenergises the magnet 69, so that the spindle stops its beating action, and from the magnet 52, while maintaining the feed to the magnet 53, so that the support 2 rises.

The expander rod having resumed its upper position, the contact 89 is operated, deenergising magnet 61, so that the spindle stops turning; also from the magnet 126, so that the servo-valve 117 is cut off; and from the magnet 120, so that the distributor 115 returns to its normal position.

Finally, the contact 7 is operated, disconnecting the current from the magnet 53, so that the distributor 51 returns to its neutral position, in which both chambers in the ram 3 are cut off.

If need be, the magnet 94 is energised, to provide compensation for wear on the tool. This compensation is possible at any stage in the cycle.

The head is then ready to be used for a further operation.

If, in the course of machining, the maximum torque should be exceeded, the pressure contact 99 will be operated, disconnecting the current from the magnet 61, so that the spindle stops, and from the magnet 69, thereby stopping the beat of the spindle.

It should be emphasised that the invention is not limited to the specific forms described and illustrated here, but includes all modifications thereof.

In particular, the sequence valve could be used in any device employing an output signal varying according to an input signal and having an adjustable threshold value.

Of the possible modifications, mention may be made of one which is particularly advantageous. The operation of micro-machining or grinding can also be carried out with the aid of a non-expanding tool. In that case, the tool must advance along the axis of the bore while making a series of approaches followed by temporary withdrawals along that axis whenever the predetermined operating torque is exceeded. This particular motion can be obtained easily by the same servo-mechanism by changing over the servo-valve to the ram 3, which then imparts to the mobile part of the unit a movement governed by the operating torque. This dependence of the movement thus takes the place of the dependence of the expansion. The successive approach movements are obtained by the pumping of the system set up by a pressure drop imposed on the pipe 95.

The machine in accordance with the invention enables automatic stopping when a bore is of the requisite size. Now, tools used for micro-machining, which are generally diamond-tipped, are extremely hard and to all intents and purposes undergo no wear during one cycle of operations, so that the position of the expander rod may be regarded as representing the size of the bore being produced.

I claim:

1. In a machine tool, the improvement which comprises a tool, hollow spindle means for rotating the tool, means for expanding the tool, said hollow spindle means having torque-sensing means interposed between the spindle and the tool including first passage means, means for delivering fluid at a pressure determined by the torque reaction to the first passage means, an operating-sequence valve means connected to said first passage means, said valve means comprising a first movable component having a second passage means therein, a second movable component for closing the second passage means, means for moving one of the components in relation to the pressure in the first passage, auxiliary passage means, and means for moving the other of the components in relation to a predetermined pressure existing in the auxiliary passage means, a servo-mechanism for controlling the said means for expanding the tool and means for operating the servo-mechanism in relation to the condition of the second passage.

2. Apparatus according to claim 1, wherein the means for moving the components comprise two bellows, one wall of each of which is fixed, the other being movable and connected to one of the said components, and means placing one of the bellows in communication with the first passage and the other of the bellows in communication with the auxiliary passage.

3. Apparatus according to claim 2, which includes resilient means opposing the movements of the movable walls of the bellows.

4. Apparatus according to claim 3, in which the bellows are disposed coaxially and the resilient means consists of a single spring interposed between the movable components of the sequence valve, the action of the spring being to urge the movable walls of the two bellows apart.

5. Apparatus according to claim 1, which includes a fluid supply pipe, an orifice in said supply pipe, and a pressure regulator in said supply pipe, said auxiliary passage means communicating with the fluid supply pipe through the orifice and pressure regulator.

6. Apparatus according to claim 5, which includes a second orifice, and a distributor having an opening to atmosphere, said auxiliary passage means being in communication, beyond the first orifice with the distributor through the second orifice.

7. Apparatus according to claim 1, wherein the servo-mechanism includes a hydraulic motor, a servo-valve feeding said hydraulic motor, and a device for moving the servo-valve operating component which includes two bellows disposed in opposition, and a distributor by which these bellows can communicate selectively with a third passage in which a reference pressure prevails and with the second passage, which latter communicates through an orifice with a first source of fluid under pressure.

8. A machine according to claim 7, comprising a second source of fluid at pressure which is above atmospheric pressure but below the pressure of the first source of fluid, and a second distributor, by which the third passage can be selectively opened either to atmosphere or placed in communication with the second source of fluid.

9. Apparatus according to claim 1, in which the means for expanding the tool includes rod means movable axially within the hollow spindle for expanding the tool in radial direction.

References Cited
UNITED STATES PATENTS

| | | | |
|---|---|---|---|
| 1,911,132 | 5/1933 | Macomber | 77—32.4 |
| 2,748,629 | 6/1956 | Hirvonen | 77—32.4 |
| 2,854,870 | 10/1958 | Chaffee et al. | 77—32.7 |
| 3,192,802 | 7/1965 | Schatzman | 77—32.7 |
| 3,283,618 | 11/1966 | Schatzman | 77—32.7 |

ERNEST R. PURSER, Primary Examiner

U.S. Cl. X.R.

77—32.7